United States Patent
De Haas et al.

[11] Patent Number: 5,772,727
[45] Date of Patent: Jun. 30, 1998

[54] PROCESS FOR THE PRODUCTION OF METAL FROM METAL ORES

[75] Inventors: Hans De Haas, Lilienthal; Joachim Janz, Oyten; Horstmar Mohnkern, Ritterhude; Manfred Voss, Bremen, all of Germany

[73] Assignee: Stahlwerke Bremen GmbH, Bremen, Germany

[21] Appl. No.: 507,247

[22] PCT Filed: Dec. 17, 1994

[86] PCT No.: PCT/EP94/01203

§ 371 Date: Aug. 18, 1995

§ 102(e) Date: Aug. 18, 1995

[87] PCT Pub. No.: WO95/17527

PCT Pub. Date: Jun. 29, 1995

[30] Foreign Application Priority Data

Dec. 21, 1993 [DE] Germany .......................... 43 43 768.0
Apr. 25, 1994 [DE] Germany .......................... 941 06 439.6

[51] Int. Cl.⁶ .................................................. C21B 5/02
[52] U.S. Cl. ................................ 75/378; 75/414; 75/460
[58] Field of Search .......................... 75/460, 461, 462, 75/463, 464, 471, 499, 500, 501, 502, 378, 414

[56] References Cited

U.S. PATENT DOCUMENTS

| | | | |
|---|---|---|---|
| 3,876,421 | 4/1975 | Takemura | 75/533 |
| 3,955,966 | 5/1976 | Meichsner | 75/532 |
| 3,998,606 | 12/1976 | Miyashita et al. | |
| 5,244,490 | 9/1993 | Agarwal | 75/500 |
| 5,554,207 | 9/1996 | Bogdan et al. | 75/500 |

FOREIGN PATENT DOCUMENTS

| | | |
|---|---|---|
| 2168596 | 8/1973 | France . |
| 29 35 544 | 3/1981 | Germany . |
| 41 04 252 | 8/1992 | Germany . |
| 2 185 970 | 8/1987 | United Kingdom . |

*Primary Examiner*—Melvyn Andrews
*Attorney, Agent, or Firm*—Spencer & Frank

[57] ABSTRACT

A process of producing metal from a metal ore containing metal oxides includes the steps of: obtaining a reducing gas containing at least one of carbon and hydrogen from solid substances containing at least one of carbon and hydrocarbons; bringing the ore into reaction contact with the reducing gas in a metallurgical blast furnace; and injecting a comminuted, fluidized plastics material into a blast current in a hearth region of the blast furnace, the plastics material comprising an agglomerate including plastics particles having a particle size substantially between 1 mm and 10 mm.

18 Claims, 3 Drawing Sheets

PROCESS FOR THE PRODUCTION OF METAL FROM METAL ORES

FIELD OF THE INVENTION

The invention relates to a process for the production of metal from metal ores, particularly of pig iron from iron ore, in which the ore containing metal oxides is brought to a reaction contact with a reducing gas containing carbon and/or hydrogen (and possibly also their compounds), the gas having been previously obtained from substances containing carbon and/or hydrocarbons.

BACKGROUND OF THE INVENTION

It is customary that ore consisting mainly of metal oxides (even other than oxides of iron) must be subjected to a reduction process before the metal can be extracted. This reduction is carried out with the help of carbon and possibly hydrogen—or also their compounds—which are contained in a reducing gas, which is used to act on the metal ore.

After that, the reduced metal ore is subjected to a melting process. The gas needed for the reduction is obtained within the region of the reduction and melting processes themselves in that carbon containing substances (e.g. coke, coal, oil, or natural gas) are added to the zone of the already reduced and heated metal whereby, with the addition of oxygen, or oxygen from air, decomposition or conversion into carbon-containing gas follows, and this is supplied for the preceding reduction.

In this respect are known the conventional blast furnace process. In this process, the reduction of the metal ore and the generation of the reducing gas and also the final melting of the metal to a liquid state all take place in the blast furnace, continuously from top to bottom. In the blast furnace process coke is added as a carbon carrier to the iron ore and possible admixtures. It is also known, for a better control of the blast furnace process and in order to save coke, to inject through lances, into the blast current, oil or pulverized coal, which reduces consumption of coke. This additionally injected material (oil or pulverized coal) must be introduced in a finely comminuted state to ensure clean and sufficient gasification. Summaries about the injection of pulverized coal into blast furnaces are contained in two articles in the magazine "Stahl und Eisen", 101 (1981) of 12.1.81, p. 35–38 and 105 (1985), no. 4 of 25.2.85, p. 211–220. The injection of pulverized powder was stepped up particularly during the increasing oil prices. It was found that during injection, due to the short time of about 10 ms which was available, good results, i.e. complete gasification of the pulverized coal, were obtained only with grain sizes below 0.1 mm, although experiments were made in some plants also with larger grain sizes.

It has already been suggested to introduce, instead of the injection of oil or pulverized coal, other carbon-containing waste materials, such as refuse, waste paper, straw, lignite and also waste wood, plastics, rubber and similar material (DE-A-29 35 544). In the absence of corresponding experiments or results only suppositions were made regarding how the substances should be introduced into the blast furnaces. Suggests the injection of carbon-containing refuse of this kind through tuyeres in fine-grained or powder form into a blast furnace, while the introduction of sedimentation sludge (flowable dust) was given as an example. Also in this process the necessity was stressed that the substance to be injected should be fine-grained.

SUMMARY OF THE INVENTION

Starting from the initially described known process, it is the aim of the invention to utilize, as a source of components for the reducing gases, plastics refuse even if it is organically and/or inorganically contaminated. Plastics refuse is always available in large quantities and represents a serious waste disposal problem. It is available mostly, though not exclusively, in solid form either as packaging waste—often heavily contaminated—or as scrap or similar waste obtained during the production of plastics articles.

Consequently the invention provides that in a process of the initially mentioned kind, substances containing carbon and/or hydrocarbons supplied to generate the reducing gas are at least partly of plastics in comminuted, fluidized form injected into the blast current in the hearth of a metallurgical shaft furnaces particularly a blast furnace, while the particle size of the plastics material is mostly in the region of 1 to 10 mm, particularly 5 mm. Therefore, for instance, plastics packaging waste—the disposal of which is still a largely unsolved problem—is introduced in comminuted form in the region of the tuyeres.

It has already been suggested to use plastics remnants as sources of a reducing agent in a blast furnace process and thereby to utilise them materially. The known method provides that plastics remnants, mixed in a superposed extrusion process, are, by the action of temperature and shearing, so far decomposed to a low-molecular substance, that this substance may be injected as a substitute for heavy oil into the blast current of a blast furnace. However, the so-called degradative extrusion for the liquefaction of the plastics material is a task, which is demanding as regards apparatus and process technology, and this makes the whole process more difficult and expensive. In addition, this processing method is delicately disturbed by metallic, organic and inorganic contaminants contained in the plastics refuse.

As has already been mentioned, for the known additional injection of oil or pulverized coal into the blast current in the region of the shaft furnace, particularly blast furnace, the material must be injected in a very finely comminuted form to ensure that during the short time available perfect gasification is achieved without any significant soot formation. If the maximum size of the coal particles is not about 0.1 mm but the grains are larger, this leads to insufficient results.

The reason for this is namely in the relatively small proportions of volatile components in the coal, so that cracking or splintering of individual particles and thereby further increase of the reaction surface cannot proceed on a sufficient scale. For the injection of oil, which practically consists of volatile components, atomization to particle sizes considerably below 0.1 mm is also needed.

The closest conclusion is that even plastics, whose chemical composition is very close to that of oil, must be ground to a comparable grain size to ensure a sufficient and fast reaction in the blast furnace. Such fine grinding of plastics, particularly thermoplastic, is not possible because, when it is very finely ground, this material becomes sticky. It has also been considered to cool such plastics to low temperatures so that this material becomes brittle and to grind it in that state. This method is, however, unacceptable for the present purpose for reasons of cost.

It was surprisingly found that when a plastics material is injected into the blast current of a metallurgical shaft furnace, very good results are obtained if, after comminution, shredding or thermal grinding, the plastics material has a much greater particle size, namely mostly in the region of 1 to 10 mm, particularly 5 mm; such particle size can be obtained without great expense. This particle size has at the same time the advantage that in the region of plastics processing, fluidization and metering, there is no danger of explosion—such as when pulverized coal is injected—so that no inert gas is needed as the fluidization gas and compressed air may be used. Particularly good results are obtained when the injected plastics material is in the form of an agglomerate having a large specific surface. Particularly a bulk density of the plastics material greater than 0.35 was found to be advantageous.

The reason for this surprising behaviour of the plastics material could lie in the peculiarities of its material composition after comminution: while in the case of—chemically similarly composed—oil the formed compact droplets have a very disadvantageous ratio of surface to mass and are therefore sufficiently reactive only for small diameters, in the case of plastics, due to the comminution process, the specific surface is by the combination of mechanical and thermic stresses so fissured and thereby increased, that the material exhibits excellent reactivity even after only a partial comminution.

It was thus found that, while using a single-step reduction process, plastics or waste plastics may be, after a little expensive comminution, used in the blast furnace process, as a very valuable reducing agent, whereby not only coal and coke are saved but also plastics waste may be usefully utilized.

In the case that the metallurgical shaft furnace is a blast furnace, the plastics material is injected in fluidized form into the air current through lances arranged in air nozzles or tuyeres. For this purpose either all lances may be supplied with fluidized plastics particles, or some of the lances are supplied with fluidized plastics particles while others are supplied with oil or coal (as hitherto). It is advantageous in such a case to arrange that the lances supplied with plastics particles and those supplied with oil or coal are uniformly distributed with respect to each other around the circumference of the tuyere assembly.

The injection pressure at the lances is preferably $0.5 \cdot 10^5$ to $1.5 \cdot 10^5$ Pa above the pressure in the blast furnace. The velocity of flow in the lances is so high that sintering (due to fusion or incipient fusion) of the plastics in the lances by backward radiation of heat from inside the furnace is avoided, the relation of the velocity of flow to the cross-sectional area of the lances being preferably between 20000 and 40000 1/(sec.m), especially 25000 1/(sec.m). Observation of this factor was necessary when pulverized coal or oil was injected into the lances in the tuyeres of a blast furnace, because these other substances do not melt and there is consequently no danger of sintering.

The mixed blast temperature in a blast furnace is normally in the region of 1000° to 1250 ° C. A temperature which is too low results in insufficient or too slow a gasification of the plastics. The mixed blast temperature is therefore preferably above 1100° C.

The injected amount of the plastics may vary within wide limits; however, due to the special properties of plastics agglomerate, it may lie higher than e.g. when oil is injected. If the injected amount of plastics is above 70 kg/t PI (PI=pig iron), then, in order to ensure good gasification, $O_2$ is added to the blast. For every kg/t PI above the value of 70 kg/t PI, enrichment of the blast by 0.05–0.1% of $O_2$, preferably 0.08% of $O_2$ was found to be advantageous.

The metering and fluidization of the plastics may be carried out in different ways. For example, the plastics particles may be fluidized in succession then metered in separate devices. This solution has the advantage that the metering device may be realized in a simple way, e.g. by mechanical metering by means of a screw or by metering by a cellular wheel. According to another example, the plastics particles may be fluidized and metered in a combined fluidization and metering device. Due to the fluctuating furnace pressure, this solution requires, however, a rapidly acting control loop by means of which the injection pressure may be adapted to the furnace pressure. A particularly simple solution resides in the use of a pressure-tight bay wheel lock.

BRIEF DESCRIPTION OF THE DRAWINGS

The invention will now be explained in greater detail, by way of example, with reference to the accompanying drawings, in which:

FIG. 2 shows and alternative embodiment of the invention shown in FIG. 1; an

DETAILED DESCRIPTION OF THE INVENTION

Figure 1:
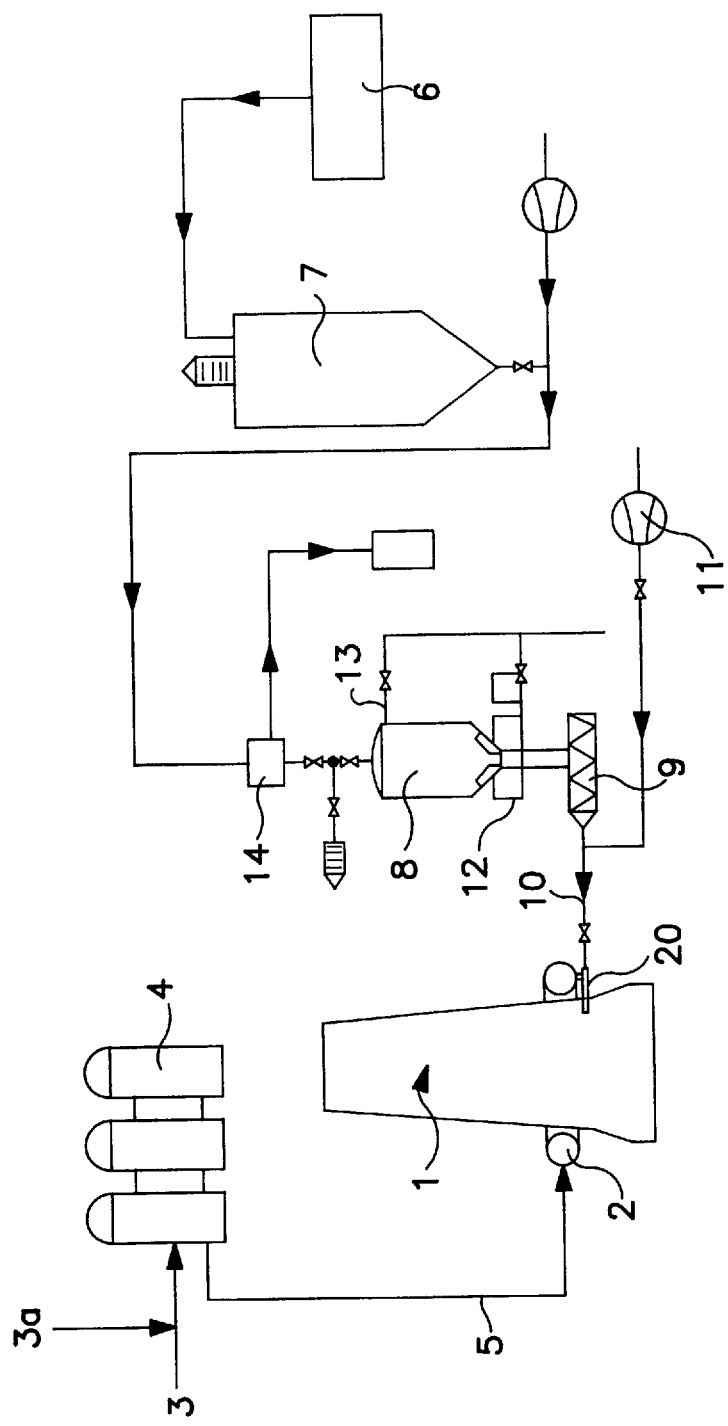
FIG. 1 shows a diagrammatic representation of a blast furnace including the relevant equipment for supplying fluidized plastics and including relevant equipment for supplying a heated blast.

In FIG. 1 is shown a blast furnace 1 of conventional design which has at its lower part comprising the hearth, a plurality of nozzles or tuyeres 20 (see FIG. 3) which are uniformly spaced around the circumference and are through a pipe 5 and a bustle pipe 2 supplied with blast 3 heated in an hot blast stove 4. The blast 3 may be enriched with oxygen 3a ($O_2$). Only one tuyere 20 is shown for reasons of clarity.

Figure 3:
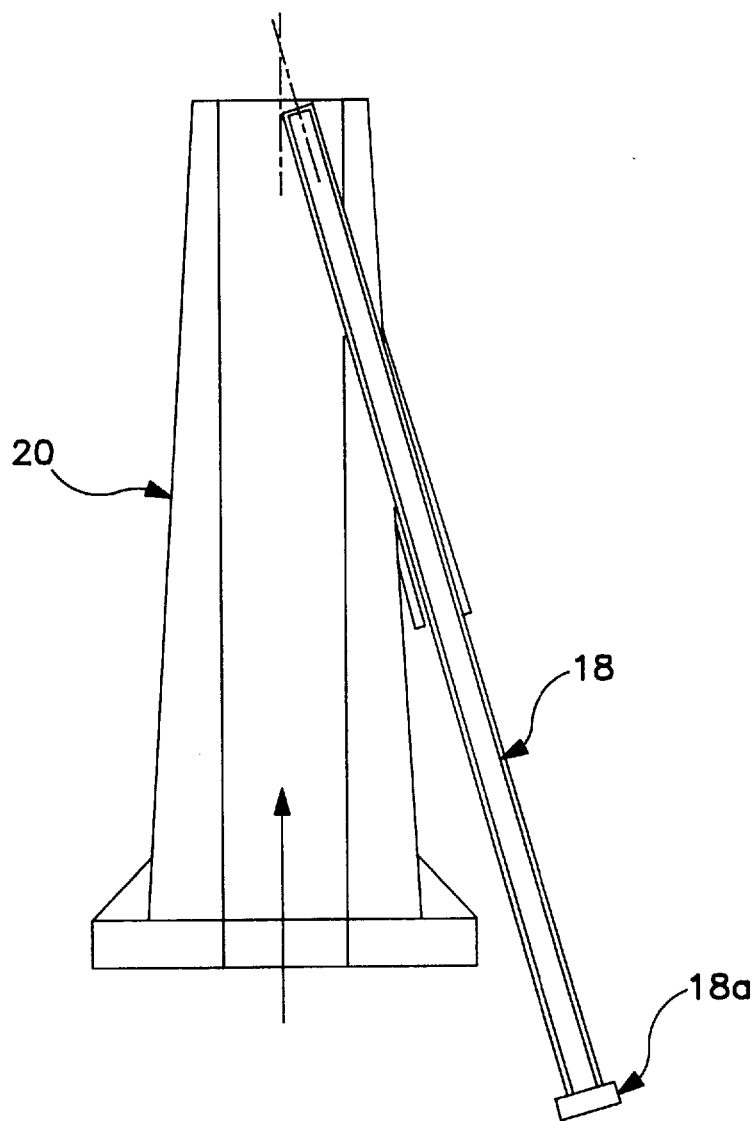
FIG. 3 shows a tuyere-lance arrangement for injecting fluidized plastics into the tuyeres or nozzles of a blast furnace.

As seen in FIG. 3, some of or all the tuyeres 20 are provided with one or more lances 18 by means of which additional fuel may be injected. This was in known blast furnaces either pulverized coal or oil, whereby better performance of the blast furnace 1 and savings of coke were achieved. The usual number of tuyeres 20 in the tuyere assembly is e.g. 32, and every tuyere has a diameter of e.g. 140 mm. For the supply of pulverized coal or oil are usually provided two lances which have typically a diameter of 12 or 8 mm. In the present case every tuyere 20 has only one lance 18 for the supply of fluidized plastics and has e.g. a diameter of 28 mm.

In the tuyere assembly, according to the inventions, either all lances 18 may be charged with plastics, or mixed charging of the tuyeres 20 is used, i.e. some tuyeres have e.g. two lances for oil, while other tuyeres 20 are provided with one lance 18 for plastics. It is, however, useful to ensure that the distribution of the lances 18 for plastics and of the lances for oil is uniform with respect to each other around the circumference of the tuyere assembly.

In the present embodiment the processing of the plastics is carried out as follows:

From a plastics processing plant 6 is supplied to a silo 7 comminuted plastics in the form of an agglomerate with a large specific surface and a grain size of 1–10 mm, preferably 5 mm. The use of plastics which resulted in an agglomerate with a bulk density grater than 0.35 was found to be good. For this purpose are suitable plastics mug-shaped packaging containers or similar items, while e.g. plastics foils, when comminuted, have a smaller bulk density, so that before or during injection special measures must be taken to enable injection of sufficient quantity.

In FIG. 1 is shown an injection vessel 8 into which is fed through a coarse-grain sieve 14 the plastics agglomerate, which is fluidized by injection of a fluidization gas by a blower 11 through pipes 12 and 13. For an injection vessel which has a volume of about 3 m³ is needed about 2–25 m³ of fluidization gas/h. The fluidized plastics is finally metered in a separate metering device 9, e.g. a mechanical metering devise using a screw or a metering device using a cellular wheel, and uniformly supplied through a pipe 10 to the corresponding lances 18 of the tuyere assembly. The transport of the plastics particles is carried out by transport in a fluid stream, i.e. with a high proportion of gas, e.g. at a ratio of 5 to 30 kg of plastics per 1 kg of fluidization gas. Pressurized air is used in the present case as the fluidization gas, because due to the size of the plastics particles of 1–10 mm, there is no danger of explosion.

The injected amount of the plastics may be varied within wide limits (e.g. 30–150 kg of plastics/t PI). It was also found that, compared to oil, an amount of plastics which is by a factor 1.5 higher, may be injected, with an equally good gasification. If the injected amount of plastics is above 70 kg/t PI, then, in order to ensure good gasification, $O_2$ is preferably added to the blast, as has already been mentioned. For every kg of plastics/t PI above the value of 70 kg/t PI, the blast should be enriched with 0.05–0.1% of $O_2$, preferably 0.08% of $O_2$. For a good gasification the mixed blast temperature from the hot blast stove 4 is above 1100° C. The injection pressure at the lances 18 is preferably $0.5 \cdot 10^5$ to $1.5 \cdot 10^5$ Pa above the pressure in the blast furnace 1.

In contrast to pulverized coal or oil, the plastics melts at higher temperatures so that there is a danger that before it leaves the injection lance 18 the plastics may be sintered by backward radiation of heat from the blast furnace. For this reason the velocity of flow of the gas with the suspended plastics particles must be sufficiently high relative to the cross-sectional area of the lance 18, so as to avoid fusion or incipient fusion and therefore sintering of the plastics in the lance 18 by backward radiation of heat. A suitable relation of the velocity of flow to the cross-sectional area of the lance lies within the region of 20000 to 40000 1/(sec.m), preferably 25000 1/(sec.m). If this value is too low, there is a danger of sintering, if it is too high, excessively high wear of the lances 18 results. Furthermore in all transport pipes, particularly in the region of connection 18a of the lances 18, must be avoided discontinuities and necking in the course of the flow and also of curves radis smaller than 1 m.

Figure 2:
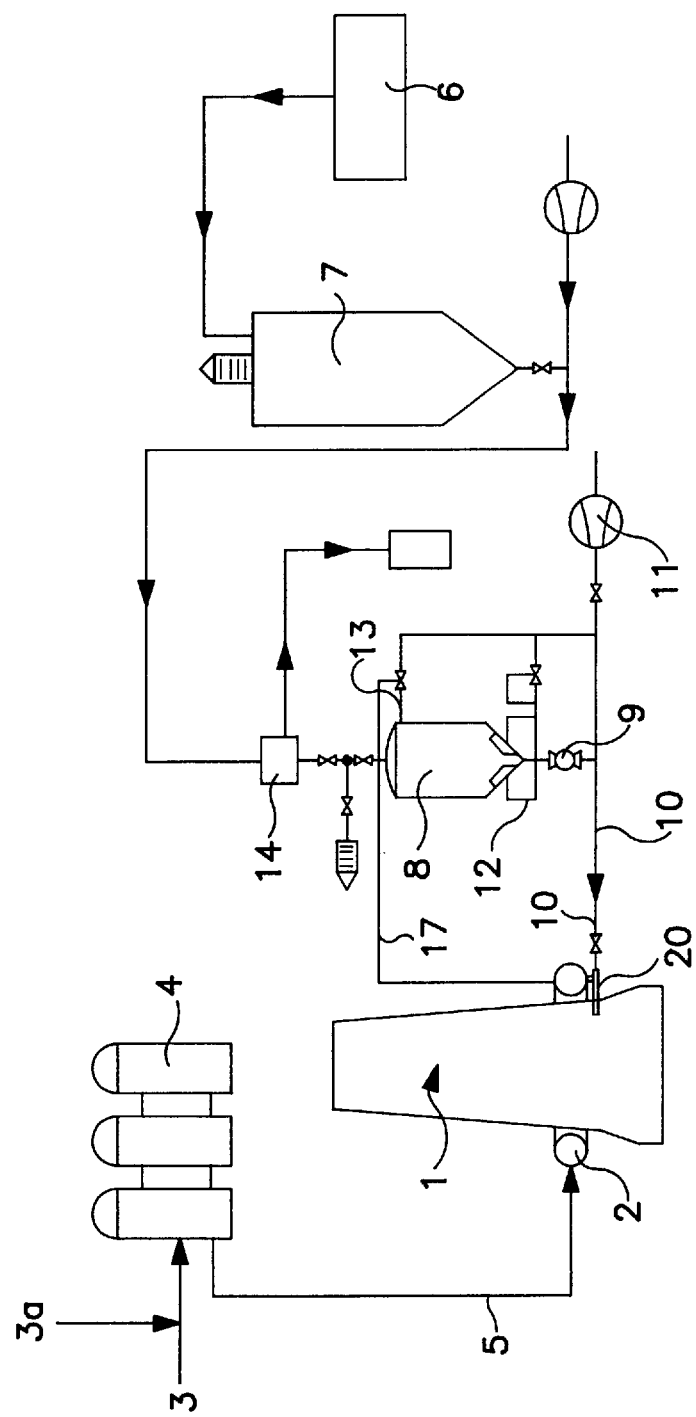

Metering may be carried out by a separate metering device 9. Another solution is shown in FIG. 2 and may consist in fluidization and metering in one operation. In the lower region of the injection vessel is for this purpose situated a ball valve 19 which serves as a metering device. Fine setting is carried out by the adjustment of pressure and the amount of fluidization gas. This solution requires, however, an accurate and fast regulation of the supply of pressurized air to the upper pipe 13 of the injection vessel 8 in dependence on the variable pressure inside the blast furnace 1. For this purpose is therefore provided at a suitable point in the blast furnace 1 a pressure sensor, which rapidly readjusts, via a control loop 17, a valve in the pipe 13 so as to obtain accurate metering.

The fluidization and metering of the plastics particles may also be obtained by a pressure-tight bay wheel lock. The injection vessel 8 may be dispensed with in this case.

We claim:

1. A process of producing metal from a metal ore containing metal oxides, the process comprising the steps of:

obtaining a reducing gas containing at least one of carbon and hydrogen from solid substances containing at least one of carbon and hydrocarbons;

bringing the ore into reaction contact with the reducing gas in a metallurgical blast furnace; and injecting a comminuted, fluidized plastics material into a blast current in a hearth region of the blast furnace, the plastics material comprising an agglomerate including plastics particles having a particle size substantially between 1 mm and 10 mm.

2. The process according to claim 1, further comprising the step of producing pig iron from iron ore.

3. The process according to claim 1, wherein the reducing gas further contains compounds of at least one of carbon and hydrogen.

4. The process according to claim 1, wherein the particle size of the plastics particles is substantially at 5 mm.

5. The process according to claim 1, further comprising the step of transporting the agglomerate in a stream of fluid in a ratio of 5 to 30 kg of agglomerate to 1 kg of fluidization gas.

6. The process according to claim 5, wherein the fluidization gas is air.

7. The process according to claim 1, wherein the agglomerate has a bulk density greater than 0.35.

8. The process according to claim 1, wherein the blast furnace includes a plurality of lances arranged in tuyeres thereof, the process further comprising the step of injecting the agglomerate into the stream of fluid in fluidized form through at least some of the lances.

9. The process according to claim 8, wherein the step of injecting the agglomerate into the stream of fluid includes the step of injecting the agglomerate into the stream of fluid in fluidized form through all of the lances.

10. The process according to claim 8, wherein:

the plurality of lances are uniformly distributed with respect to one another around a circumference of a tuyere assembly of the blast furnace and comprise a first set of lances and a second set of lances; and the step of injecting the agglomerate into the stream of fluid includes the step of injecting the agglomerate into the stream of fluid in fluidized form through the first set of lances;

the process further including the step of injecting one of oil and coal through the second set of lances.

11. The process according to claim 8, wherein an injection pressure in the at least some of the lances is $0.5 \times 10^5$ to $1.5 \times 10^5$ Pa above a pressure present in the blast furnace.

12. The process according to claim 8, wherein a ratio of a velocity of flow to a cross sectional area of each of the at least some of the lances is high enough such that sintering caused by fusion of the plastics material in the at least some of the lances by backward radiation of heat is avoided, the ratio being between 20000 and $40000 \times 1/(\text{sec} \times \text{m})$.

13. The process according to claim 12, wherein the ratio is $25000 \times 1/(\text{sec} \times \text{m})$.

14. The process according to claim 1, wherein a mixed blast temperature of the blast furnace is higher than 1100 degrees centigrade.

15. The process according to claim 1, further comprising the step of enriching the blast current with $O_2$ in an amount of 0.05 to 0.1% of $O_2$ per kg of injected plastics/t PI exceeding 70 kg/t PI.

16. The process according to claim 15, wherein the step of enriching includes the step of enriching the blast current with $O_2$ in an amount of 0.08% of $O_2$ per kg of injected plastics/t PI exceeding 70 kg/t PI.

17. The process according to claim 1, further comprising the steps of:

fluidizing the agglomerate in a first device; and thereafter metering the agglomerate in a second device distinct from the first device.

18. The process according to claim 1, further comprising the steps of:

fluidizing and metering the agglomerate in a combined fluidization and metering device; and continuously adjusting an injection pressure of the agglomerate utilizing a control loop in dependence on a pressure in the blast furnace.

* * * * *

UNITED STATES PATENT AND TRADEMARK OFFICE
CERTIFICATE OF CORRECTION

PATENT NO. : 5,772,727
DATED : June 30, 1998
INVENTOR(S) : HAAS et al

It is certified that error appears in the above-identified patent and that said Letters Patent is hereby corrected as shown below:

On the title page, item [86], the PCT number should read --PCT/EP94/04203--.

Signed and Sealed this

Twenty-fourth Day of November, 1998

Attest:

Attesting Officer

BRUCE LEHMAN

Commissioner of Patents and Trademarks